United States Patent
Sugimoto et al.

(10) Patent No.: US 6,944,003 B2
(45) Date of Patent: Sep. 13, 2005

(54) SEMICONDUCTOR INTEGRATED CIRCUIT WITH VOLTAGE-DETECTING CIRCUIT AND SIGNAL TRANSMITTING AND RECEIVING SYSTEM

(75) Inventors: Hirokazu Sugimoto, Osaka (JP); Takashi Hirata, Osaka (JP); Hironori Akamatsu, Osaka (JP); Toru Iwata, Osaka (JP); Satoshi Takahashi, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 391 days.

(21) Appl. No.: 10/365,527

(22) Filed: Feb. 13, 2003

(65) Prior Publication Data

US 2003/0169551 A1 Sep. 11, 2003

(30) Foreign Application Priority Data

Mar. 6, 2002 (JP) ....................................... 2002-060029

(51) Int. Cl.[7] ................................................ H02H 3/24
(52) U.S. Cl. ......................................... 361/92; 710/100
(58) Field of Search ............................. 361/92; 710/100

(56) References Cited

U.S. PATENT DOCUMENTS 5,559,966 A * 9/1996 Cho et al. .................... 710/105
5,852,743 A * 12/1998 Yeh .............................. 710/18
6,378,026 B1 * 4/2002 Chan et al. .................. 710/300

FOREIGN PATENT DOCUMENTS

| JP | 03143064 A | * | 6/1991 | ........... H04M/11/00 |
| JP | 07221819 A | * | 8/1995 | ............. H04M/1/00 |
| JP | 11-27432 | | 1/1999 | |

* cited by examiner

Primary Examiner—Brian Sircus
Assistant Examiner—Boris Benenson
(74) Attorney, Agent, or Firm—McDermott Will & Emery LLP

(57) ABSTRACT

A first semiconductor integrated circuit is connected to a second semiconductor integrated circuit with a cable. In the first semiconductor integrated circuit, when a power supply voltage becomes less than a set voltage detection level, a voltage-detecting circuit outputs a voltage-detected signal to lower the voltage of the cable and to stop the operation. The second semiconductor integrated circuit detects the decrease in the voltage of the cable to recognize the halt of the operation of the first semiconductor integrated circuit. In the first semiconductor integrated circuit thus configured, in testing the operation under low-voltage conditions in which the power supply voltage is less than the set voltage detection level, the voltage-detecting circuit receives a control signal from an external terminal to stop the operation forcibly. Consequently, even when the power supply voltage is made lower than the set voltage-detecting level, the first semiconductor integrated circuit properly operates until the power supply voltage reaches a predetermined lower limit of operating voltage. Thus, evaluation of operation is possible under low-voltage conditions.

3 Claims, 3 Drawing Sheets

SEMICONDUCTOR INTEGRATED CIRCUIT WITH VOLTAGE-DETECTING CIRCUIT AND SIGNAL TRANSMITTING AND RECEIVING SYSTEM

BACKGROUND OF THE INVENTION

The present invention relates to semiconductor integrated circuits with voltage-detecting circuits, and signal transmitting and receiving systems.

The following describes a conventional method of recognizing connection between semiconductor integrated circuits having an interface, such as in an IEEE 1394 standard interface, with which the semiconductor integrated circuits are connected to each other by cables.

A semiconductor integrated circuit (hereafter referred to as "LSI") has, its inside, a voltage-generating circuit for supplying a predetermined voltage to a cable connected thereto, a cable voltage-detecting circuit for detecting the voltage of the connected cable, and a power supply voltage-detecting circuit for detecting a power supply voltage to stop the supply of the predetermined voltage from the voltage-generating circuit to the cable when the power supply voltage becomes lower than a set voltage. The following describes recognition of the connection state in which two LSIs, LSI 1 and LSI 2 each having the foregoing voltage-generating circuit, the cable voltage-detecting circuit, and, the power supply voltage-detecting circuit, are connected to each other by two cables.

The LSI 1 supplies a predetermined voltage from the voltage-generating circuit to a first cable. The voltage is detected by the cable voltage-detecting circuit in the LSI 2 and it is recognized that the LSI 2 is connected with the LSI 1. Meanwhile, the LSI 2 also supplies a predetermined voltage from the voltage-generating circuit to a second cable; the LSI 1 detects the voltage with the cable voltage-detecting circuit and it is recognized that the LSI 1 is connected with the LSI 2. The voltage-generating circuit in each of the LSIs continues to supply the predetermined voltage to the first and the second cables respectively until the interconnection therebetween is cut off.

In such a state of connection, for example, when the power supply of the LSI 1, one of the LSIs, is completely shut off and the power supply voltage becomes lower than a set voltage, the power supply voltage-detecting circuit detects the voltage decrease and the supply of the predetermined voltage from voltage-generating circuit to the first cable is cut off. Accordingly, the voltage of the first cable decreases lower than a predetermined voltage, the cable voltage-detecting circuit in the LSI 2, the other one of the LSIs, detects the voltage decrease and recognizes that the LSI 1 is disconnected. Thereafter, when power is again turned on for the LSI 1, a predetermined voltage is supplied from the voltage-generating circuit therein to the first cable, and the cable voltage-detecting circuit in the LSI 2, which is the other LSI, re-recognizes that the LSI 1 is connected.

The above-described conventional configuration has at least the following drawback. If the voltage detection level for the power supply is set low, the operation of the power supply voltage-detecting circuit becomes unstable. On the other hand, if the voltage detection level is set high, the power supply voltage-detecting circuit starts to operate when the power supply voltage is made lower than the voltage detection level to evaluate an operation of the LSI, and consequently the voltage-generating circuit stops the operation. For this reason, it is very difficult to set the voltage detection level of the power supply voltage-detecting circuit.

Moreover, in the foregoing conventional configuration, in cases where the power supply voltage suddenly drops during the shut-off of the power supply, the duration in which a voltage-detected signal is output from the power supply voltage-detecting circuit is extremely short, and therefore, the voltage-generating circuit does not properly operate in such a short duration. For this reason, the voltage of the first cable does not decrease to a voltage that is lower than a connection detection level. As a result, although the power supply has been shut off, the second LSI 2 can misrecognize that the first LSI 1 is still connected.

SUMMARY OF THE INVENTION

It is an object of the present invention to appropriately control the power supply voltage-detecting circuit according to the operating state of a semiconductor integrated circuit, such as in normal operation and in an operation evaluation, and to appropriately control the power supply voltage-detecting circuit according to the state of change in the power supply voltage when the power supply is shut off.

This and other objects are accomplished in accordance with the present invention by a configuration such that in evaluating an operation of a semiconductor integrated circuit, a voltage-detected signal is not output from a power supply voltage-detecting circuit so that the semiconductor integrated circuit can operate even when the power supply voltage of the semiconductor integrated circuit becomes less than a predetermined detection level of the power supply voltage-detecting circuit, or the voltage-detected signal is output from the power supply voltage-detecting circuit for a relatively long time to ensure a proper operation of the voltage-generating circuit even when the power supply voltage suddenly drops during the shut-off of the power supply.

Specifically, the present invention provides a semiconductor integrated circuit, connected to another semiconductor integrated circuit with a cable, comprising: a voltage-detecting circuit that outputs a voltage-detected signal when the voltage of a power supply is less than a predetermined voltage detection level; and a voltage-generating circuit that stops supplying, to the cable, a voltage that is equal to or higher than a predetermined connection detection level in response to the voltage-detected signal from the voltage-detecting circuit; wherein an external terminal is provided therewith; and wherein the voltage-detecting circuit receives a control signal from the external terminal and the control signal controls whether the voltage-detected signal is output or not, irrespective of the voltage of the power supply.

The present invention also provides, according to another aspect, a semiconductor integrated circuit, connected to another semiconductor integrated circuit with a cable, comprising: a voltage-detecting circuit that outputs a voltage-detected signal when the voltage of a power supply of the semiconductor integrated circuit is less than a predetermined voltage detection level; and a voltage-generating circuit that stops supplying, to the cable, a voltage that is equal to or higher than a predetermined connection detection level in response to the voltage-detected signal from the voltage-detecting circuit; wherein a state machine that determines operating state of the semiconductor integrated circuit is provided therewith; and wherein the voltage-detecting circuit is connected to a power supply of the state machine so that the voltage of the power supply of the state machine controls whether the voltage-detected signal is output or not, irrespective of the voltage of the power supply.

The present invention also provides, according to still another aspect, a signal transmitting and receiving system comprising a first and a second semiconductor integrated circuits and a first and a second cables connecting the first and the second semiconductor integrated circuits each other, wherein: the first semiconductor integrated circuit comprises: a voltage-detecting circuit that outputs a voltage-detected signal when the voltage of a power supply is less than a predetermined voltage detection level; and a first voltage-generating circuit such that it generates a voltage that is equal to or higher than a predetermined connection detection level and supplies the voltage to the first cable when the voltage-detected signal is not received from the voltage-detecting circuit, whereas it stops generating the voltage equal to or higher than the predetermined connection detection level when the voltage-detected signal is received from the voltage-detecting circuit; and the second semiconductor integrated circuit comprises: a second voltage-generating circuit that supplies to the second cable a voltage that is equal to or higher than the predetermined connection detection level while the first voltage-generating circuit is supplying to the first cable the voltage that is equal to or higher than the predetermined connection detection level; wherein the voltage-detecting circuit of the first semiconductor integrated circuit is provided with, as a power supply thereto, the voltage that is equal to or higher than the predetermined connection detection level of the second cable, in addition to the power supply of the first semiconductor integrated circuit.

Accordingly, in the present invention, for evaluating a semiconductor integrated circuit, for example, a high-level control signal is input from an external terminal into the voltage-detecting circuit so that the voltage-detecting circuit does not operate. This setting makes it possible to evaluate an operation of the semiconductor integrated circuit at the lower limit of its operating voltage even if the power supply voltage is made lower than a predetermined detection level of the voltage-detecting circuit. On the other hand, for normal operation, a low-level control signal is input from the external terminal to the voltage-detecting circuit so that the voltage-detecting circuit performs normal operation. With this setting, when the power supply is shut off and the power supply voltage decreases to a voltage lower than a predetermined voltage detection level, the voltage-detecting circuit outputs the voltage-detected signal to stop the voltage-generating circuit from generating a voltage that is equal to or higher than a predetermined connection level, and therefore, the voltage of the cable becomes less than the predetermined connection level. Hence, another (the second) semiconductor integrated circuit that is connected to this (the first) semiconductor integrated circuit with the cable can properly recognize that the connection with the first semiconductor integrated circuit has been cut off.

Moreover, in the present invention, when evaluating an operation of the semiconductor integrated circuit, the voltage of the power supply of the state machine is supplied to the voltage-detecting circuit to stop the voltage-detecting circuit from operating and prevent the voltage-detected signal from being output at all times. Therefore, even if the voltage of the power supply in the semiconductor integrated circuit is made less than the predetermined voltage detection level, the voltage-generating circuit outputs a voltage that is equal to or higher than the connection detection level to the cable. Consequently, it is recognized that this (the first) semiconductor integrated circuit and the second semiconductor integrated circuit which is connected thereto via the cable are in the state of connection, and under this condition, it is possible to evaluate an operation of the first semiconductor integrated circuit at the lower limit of its operating voltage.

Furthermore, in the present invention, when it is recognized that the first semiconductor integrated circuit and the second semiconductor integrated circuit are in the state of connection, the second voltage-generating circuit outputs a voltage that is equal to or higher than a predetermined connection detection level to the second cable, the second semiconductor integrated circuit. Under this condition, if the power supply of the first semiconductor integrated circuit is shut off, the power supply voltage decrease to a voltage less than the predetermined voltage detection level. Then, the voltage-detecting circuit in the first semiconductor integrated circuit outputs the voltage-detected signal and the operation of the first voltage-generating circuit stops. Consequently, the voltage of the first cable starts to drop to a voltage less than the predetermined connection detection level. Here, even if the power supply voltage drops quickly, a voltage that is equal to or higher than the predetermined connection detection level is supplied as the power supply from the second cable to the voltage-generating circuit in the first semiconductor integrated circuit. Therefore, the voltage-detected signal continues to be supplied using this voltage as the power supply. As a result, the voltage-generating circuit in the first semiconductor integrated circuit operates reliably in the normal way, and the voltage of the first cable becomes a voltage less than the predetermined connection detection level. As a consequence, in the second semiconductor integrated circuit, it is properly recognized that the connection with the first semiconductor integrated circuit is cut off, and after that, the second voltage-generating circuit stops outputting a voltage that is equal to or higher than the predetermined connection detection level. Thus, the voltage of the second cable becomes a voltage lower than the predetermined connection detection level.

DETAILED DESCRIPTION OF THE INVENTION

Hereinbelow, preferred embodiments of the present invention are described with reference to the appended drawings.

Embodiment 1

Figure 1:
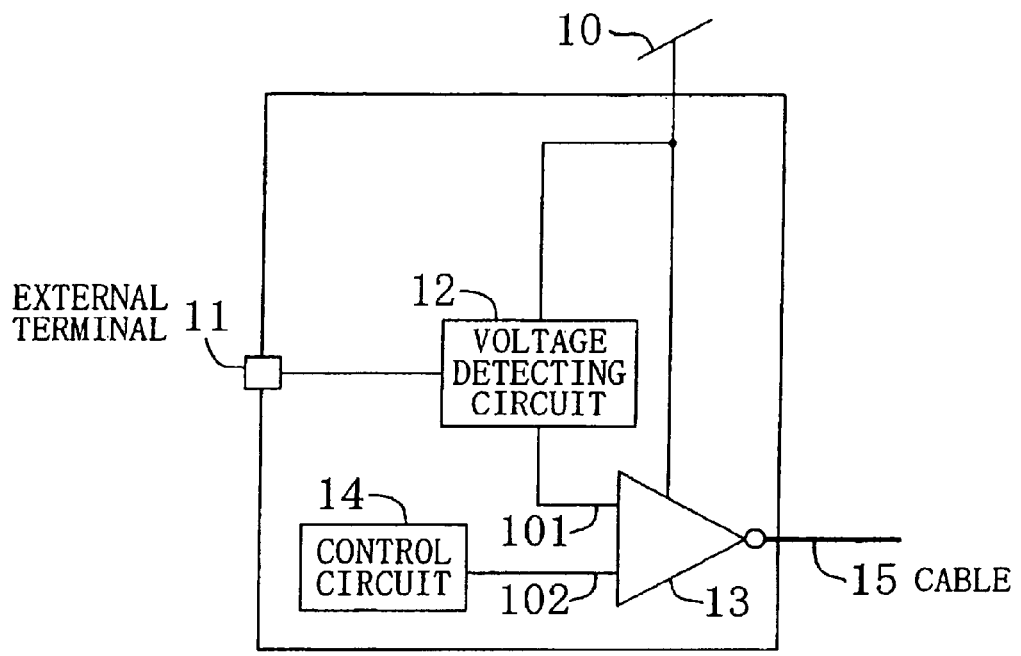
FIG. 1 shows the configuration of a semiconductor integrated circuit having a voltage-detecting circuit according to Embodiment 1 of the present invention.

FIG. 1 is a diagram showing the configuration of a semiconductor integrated circuit comprising a voltage-detecting circuit according to Embodiment 1 of the present invention.

In the figure, reference numeral 10 denotes a power supply, and numeral 12 denotes a voltage-detecting circuit connected to the power supply 10. The voltage-detecting circuit 12 detects the voltage of the power supply 10 to output a voltage-detected signal 101 when the power supply voltage is less than a predetermined voltage detection level. Reference numeral 13 denotes a voltage-generating circuit that receives the voltage-detected signal from the voltage-detecting circuit 12. When the voltage-generating circuit 13 does not receive the voltage-detected signal from the voltage-detecting circuit 12, it generates a voltage that is equal to or higher than a predetermined connection detection level to output the voltage to a cable 15, whereas when it receives the voltage-detected signal, it stops generating the voltage that is equal to or higher than the predetermined connection detection level to let the voltage of the cable 15 be less than the predetermined connection detection level. Reference numeral 14 denotes a control circuit that outputs a control signal 102 for controlling the voltage-generating circuit 13. The control circuit 14 permits the operation of the voltage-generating circuit 13, for example, when the control signal 102 is at a high level, whereas it inhibits the operation thereof when the control signal 102 is at a low level. The cable 15 connects this semiconductor integrated circuit with another semiconductor integrated circuit, which is not shown in the figure.

Reference numeral 11 denotes an external terminal provided for this semiconductor integrated circuit. To the external terminal 11, a control signal is input from outside, and the control signal is input to the voltage-detecting circuit 12. In the voltage-detecting circuit 12, generation and output of the voltage-detected signal are permitted when the control signal is, for example, at a high level, whereas the generation and output of the voltage-detected signal are inhibited when the control signal is, for example, at a low level.

An operation of the semiconductor integrated circuit thus configured is described below.

When the power supply voltage of the power supply 10 decreases to a voltage lower than a voltage detection level of the voltage-detecting circuit 12, the voltage-detecting circuit 12 generates a voltage-detected signal 101. Under the circumstance in which, for example, the operation is permitted by the high-level control signal 102, the voltage-generating circuit 13 receives the voltage-detected signal 101 from the voltage-detecting circuit 12 and stops supplying a predetermined voltage to the cable 15.

When evaluating an operation of this semiconductor integrated circuit, if the power supply voltage of the power supply 10 is reduced to a voltage lower than the voltage detection level of the voltage-detecting circuit 12 in such cases similar to the conventional example where the control signal is not output from the external terminal 11 to the voltage-detecting circuit 12, the voltage-detecting circuit 12 outputs the voltage-detected signal and consequently the voltage-generating circuit 13 stops supplying a predetermined voltage to the cable 15. Therefore, operation testing of this semiconductor integrated circuit can be performed only to the voltage detection level of the voltage-detecting circuit 12, and it cannot be performed to the actual lower limit of operating voltage of this semiconductor integrated circuit.

By contrast, in the present embodiment, when a high-level control signal is input to the external terminal 11, the voltage-detecting circuit 12 is inhibited from outputting the voltage-detected signal. For this reason, even when the power supply voltage of the power supply 10 is made lower than the voltage detection level, the voltage-detected signal 101 is not output, and the voltage-generating circuit 13 continues a predetermined operation. Therefore, by inputting a high-level control signal from the external terminal 11, it is possible to evaluate a low-voltage operation of this semiconductor integrated circuit in which the power supply voltage of the power supply 10 is set to be less than the voltage detection level of the power supply 10.

On the other hand, in cases where a low-level control signal is input to the external terminal 11, the voltage-detected signal 101 of the voltage-detecting circuit 12 is permitted to be output. Therefore, the operation of the voltage-generating circuit 13 is similar to the conventional example.

Thus, according to the present embodiment of the invention, the control signal from the external terminal 11 controls whether the operation the voltage-detecting circuit 12 is permitted or inhibited, and therefore, it is possible to evaluate a low-voltage operation at a voltage less than the voltage detection level of the voltage-detecting circuit 12.

It should be noted that in the foregoing example, the operation of the voltage-detecting circuit 12 is inhibited when the control signal input to the external terminal 11 is at a high level. However, it is of course possible that the operation of the voltage-detecting circuit 12 may be inhibited by inputting a low-level control signal whereas the operation of the voltage-detecting circuit 12 may be permitted by inputting a high-level control signal.

Embodiment 2

Figure 2:
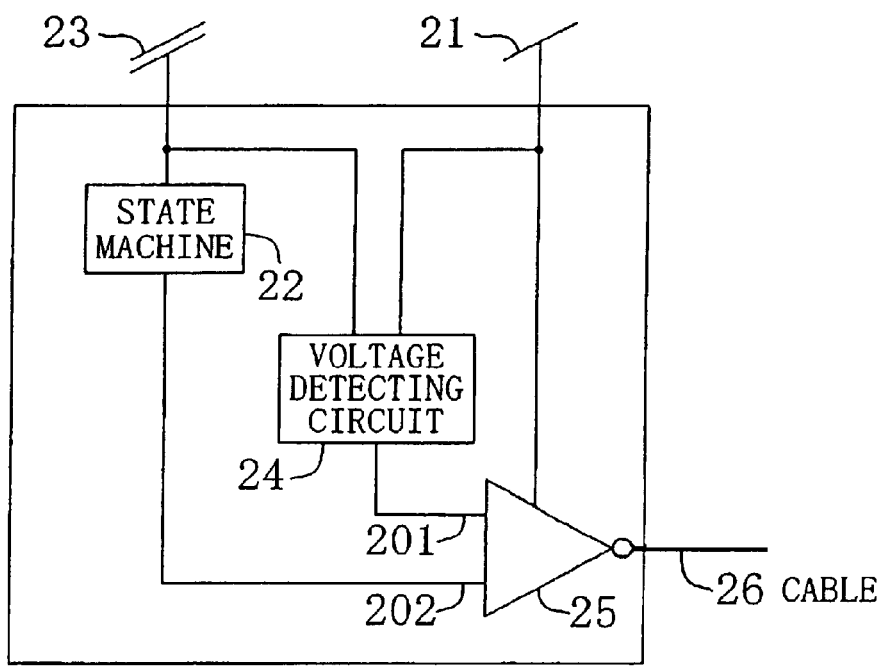
FIG. 2 shows the configuration of a semiconductor integrated circuit having a voltage-detecting circuit according to Embodiment 2 of the present invention.

FIG. 2 shows the configuration of a semiconductor integrated circuit having a voltage-detecting circuit according to Embodiment 2 of the present invention.

In the figure, reference numeral 21 denotes a power supply of the semiconductor integrated circuit, numeral 22 denotes a state machine that performs switching between a test mode and normal operation or the like to determine the operating state of the semiconductor integrated circuit, and numeral 23 denotes a power supply of the state machine 22. Reference numeral 24 denotes a voltage-detecting circuit that is connected to a power supply 21 of the semiconductor integrated circuit. When the voltage of the power supply 21 thereof becomes less than a predetermined voltage detection level, the voltage-detecting circuit 24 outputs a voltage-detected signal 201.

Reference numeral 25 denotes a voltage-generating circuit that receives the voltage-detected signal 201 from the voltage-detecting circuit 24. In a similar manner to that of the voltage-generating circuit 13 shown in FIG. 1, the voltage-generating circuit 25 generates a voltage that is equal to or higher than a predetermined connection detection level and supplies the voltage to the cable 26 when it does not receive the voltage-detected signal 201 from the voltage-detecting circuit 24; on the other hand, it stops generating a voltage that is equal to or higher than the predetermined connection detection level to let the voltage of the cable 26 be a voltage that is less than the predetermined connection detection level, when it receives the voltage-detected signal 201. The state machine 22 generates a control signal 202 that controls the voltage-generating circuit 25. The operation of the voltage-generating circuit 25 is permitted when the control signal 202 is, for example, at a high level, whereas the operation thereof is inhibited when the control signal 202 is at a low level. The cable 26 connects this semiconductor integrated circuit with another semiconductor integrated circuit, which is not shown in the figure.

The voltage-detecting circuit 24 is connected to the power supply 23 of the state machine 22. During normal operation in which power is not supplied from the power supply 23 of the state machine 22, the voltage-detecting circuit 24 is permitted to perform the normal operation for outputting a voltage-detected signal when the power supply voltage of the power supply 21 in this semiconductor integrated circuit becomes lower than a predetermined connection detection level. On the other hand, during an operation evaluation in which power is supplied from the power supply 23 of the state machine 22, it is forcibly inhibited from performing an operation for outputting the voltage-detected signal.

An operation of the semiconductor integrated circuit thus configured is described below.

In cases where the high-level control signal 202 is input from the state machine 22 to the voltage-generating circuit 25, the voltage-generating circuit 25 is permitted to perform its operation. Thus, if the power supply voltage of the power supply 21 in this semiconductor integrated circuit becomes lower than the voltage detection level of the voltage-detecting circuit 24 and consequently the voltage-generating circuit 25 receives the voltage-detected signal 201 from the voltage-detecting circuit 24, the voltage-generating circuit 25 stops supplying a voltage that is equal to or more than a predetermined detection level to the cable 26.

When evaluating an operation of this semiconductor integrated circuit, if the power supply voltage of the power supply 21 is reduced to a voltage lower than the voltage detection level in such cases similar to the conventional example in which the power supply 23 of the state machine 22 is not supplied to the voltage-detecting circuit 24, the voltage-detecting circuit 24 outputs the voltage-detected signal 201 and consequently the voltage-generating circuit 25 stops the supply of a predetermined voltage to the cable 26. Therefore, operation testing of this semiconductor integrated circuit can be performed only to the voltage detection level of the voltage-detecting circuit 24, and it cannot be performed to the actual lower limit of operating voltage of this semiconductor integrated circuit. Nevertheless, in the present embodiment, when evaluating an operation of this semiconductor integrated circuit, the power supply 23 of the state machine 22 is supplied to the voltage-detecting circuit 24 to inhibit the operation of the voltage-detecting circuit 24, and the voltage-detected signal 201 is not output even if the power supply voltage of the power supply 21 in the semiconductor integrated circuit is made lower than the voltage detection level of the voltage-detecting circuit 24.

As described above, in this embodiment of the present invention, the operation of the voltage-detecting circuit 24 is permitted or inhibited according to whether the power supply 23 of the state machine 22 is supplied or not, to separate the normal operation and the operation evaluation of the semiconductor integrated circuit. Therefore, when evaluating an operation of the semiconductor integrated circuit, it is possible to evaluate the operation in which the voltage of the power supply 21 in the semiconductor integrated circuit is made less than the voltage detection level of the voltage-detecting circuit 24.

Embodiment 3

Figure 3:
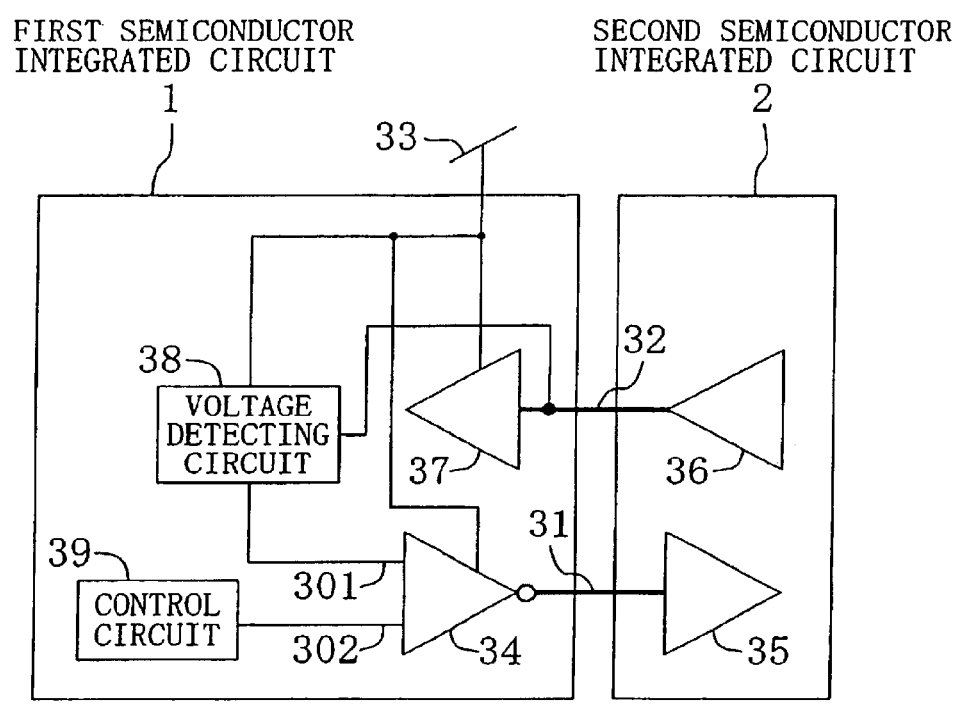
FIG. 3 shows the configuration of a signal transmitting and receiving system according to Embodiment 3 of the present invention.

FIG. 3 shows the overall configuration of a signal transmitting and receiving system according to Embodiment 3 of the present invention.

In the figure, reference numeral 1 denotes a first semiconductor integrated circuit, numeral 2 denotes a second semiconductor integrated circuit, numerals 31 and 32 denote a first and a second cables, respectively, that connect the first semiconductor integrated circuit 1 and the second semiconductor integrated circuit 2, and numeral 33 denotes a power supply of the first semiconductor integrated circuit 1.

The first semiconductor integrated circuit 1 has a voltage-detecting circuit 38 that is connected to the power supply 33 of the first semiconductor integrated circuit 1. The voltage-detecting circuit 38 outputs a voltage-detected signal 301 when the power supply voltage is less than a predetermined voltage detection level. Reference numeral 34 denotes a first voltage-generating circuit. The first voltage-generating circuit 34 generates a voltage that is equal to or higher than a predetermined connection detection level when it does not receive the voltage-detected signal from the voltage-detecting circuit 38 to output the voltage to the first cable 31. On the other hand, the first voltage-generating circuit 34 stops generating the voltage that is equal to or higher than the predetermined connection detection level to let the voltage of the first cable 31 be a voltage that is less than the predetermined connection detection level, when it receives the voltage-detected signal. Reference numeral 39 denotes a control circuit that outputs a control signal 302 for controlling the voltage-generating circuit 34. When the control signal 302 is, for example, at a high level, the voltage-generating circuit 34 is permitted to generate a voltage that is equal to or higher than the connection detection level; whereas when it is at a low level, the voltage-generating circuit 34 is inhibited from generating and outputting the voltage that is equal to or higher than the connection detection level.

The second semiconductor integrated circuit 2 has a second connection-detecting circuit 35, which recognizes connection with the first semiconductor integrated circuit 1 when the voltage that is equal to or higher than the connection detection level is supplied to the first cable 31. Reference numeral 36 denotes a second voltage-generating circuit, which supplies the voltage that is equal to or higher than the predetermined connection detection level to the second cable 32 when the voltage that is equal to or higher than the connection detection level is supplied to the first cable 31.

In addition, the first semiconductor integrated circuit 1 is provided with a first connection-detecting circuit 37 that recognizes connection with the second semiconductor integrated circuit 2 when a voltage that is equal to or higher than the connection detection level is supplied from the second voltage-generating circuit 36 of the second semiconductor integrated circuit 2 to the second cable 32. The first voltage-detecting circuit 38 is supplied, as a power supply, with a voltage that is equal to or higher than the connection detection level supplied from the second voltage-generating circuit 36 of the second semiconductor integrated circuit 2 to the second cable 32, in addition to the power supply 33 of the first semiconductor integrated circuit 1.

An operation of the signal transmitting and receiving system according to the present embodiment is described below.

When the voltage of the power supply 33 in the first semiconductor integrated circuit 1 becomes lower than the voltage detection level of the voltage-detecting circuit 38, the voltage-detecting circuit 38 generates the voltage-detected signal 301. Here, if the control circuit 39 is outputting a high-level control signal 302, the voltage-generating circuit 34 is permitted to perform its operation, so it stops outputting a voltage that is equal to or higher than a predetermined connection detection level in response to the voltage-detected signal 301 from the voltage-detecting circuit 38 to let the voltage of the first cable 31 be a voltage that is less than the predetermined connection detection level. The second semiconductor integrated circuit 2 recognizes that the first semiconductor integrated circuit 1 is not connected therewith since the voltage of the first cable 31 becomes less than the connection detection level of the second connection-detecting circuit 35, and it stops the supply of a voltage that is equal to or higher than a predetermined detection level from the second voltage-generating circuit 36 to the second cable 32.

However, the voltage-detecting circuit 38 of the first semiconductor integrated circuit 1 is operated by the power supply 33 of the first semiconductor integrated circuit 1, and depending on the drop rate of the power supply voltage during the shut-off of the power supply 33, it is possible that the voltage-generating circuit 34 does not stop the supply of a voltage that is equal to or higher than the connection detection level because the duration of output of the voltage-detected signal 301 from the voltage-detecting circuit 38 is too short. The details are described below with reference to FIG. 5.

Figure 5:
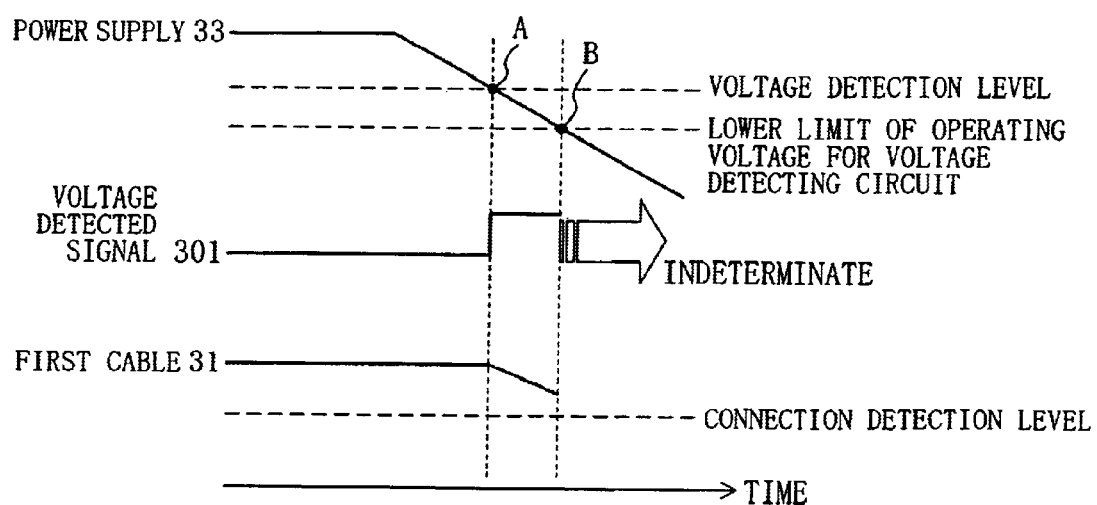
FIG. 5 is timing diagram showing an operation of the signal transmitting and receiving system when voltage is shut off in a case where power is not supplied from the second cable to the voltage-detecting circuit of the first semiconductor integrated circuit.

FIG. 5 shows a timing chart depicting the voltages of the power supply 33 during the shut-off of the power supply when the voltage of the second cable 32 is not supplied to the voltage-detecting circuit 38, the voltage-detected signal 301, and the first cable 31. As seen in the figure, when the voltage of the power supply 33 drops with the shut-off and reaches a point A, which is a voltage detection level, the voltage-detected signal 301 is output from the voltage-detecting circuit 38. Thereafter, when the voltage of the power supply 33 reaches a point B, which is the lower limit of operating voltage, the voltage-detected signal 301 becomes an indeterminate state. As a consequence, the state of the output voltage to the first cable 31 from the voltage-generating circuit 34, which receives the voltage-detected signal 301, becomes indeterminate. If this is the case, the voltage of the first cable 31 may not be reduced than a connection detection level when the voltage drop rate of the power supply 33 is high, and as a result, the second semiconductor integrated circuit 2 may misrecognize that the first semiconductor integrated circuit 1 is connected even though the power supply 33 has been shut off.

In the present embodiment, however, power is supplied from the second cable 2 to the first voltage-detecting circuit 38 of the first semiconductor integrated circuit 1; therefore, even when the power supply from the power supply 33 is shut off, the voltage-detecting circuit 38 accurately operates as desired so that the voltage-detected signal 301 is output for a normal output duration, irrespective of the drop rate of the power supply voltage of the power supply 33. The details of this operation of the signal transmitting and receiving system are presented below with reference to FIG. 4.

Figure 4:
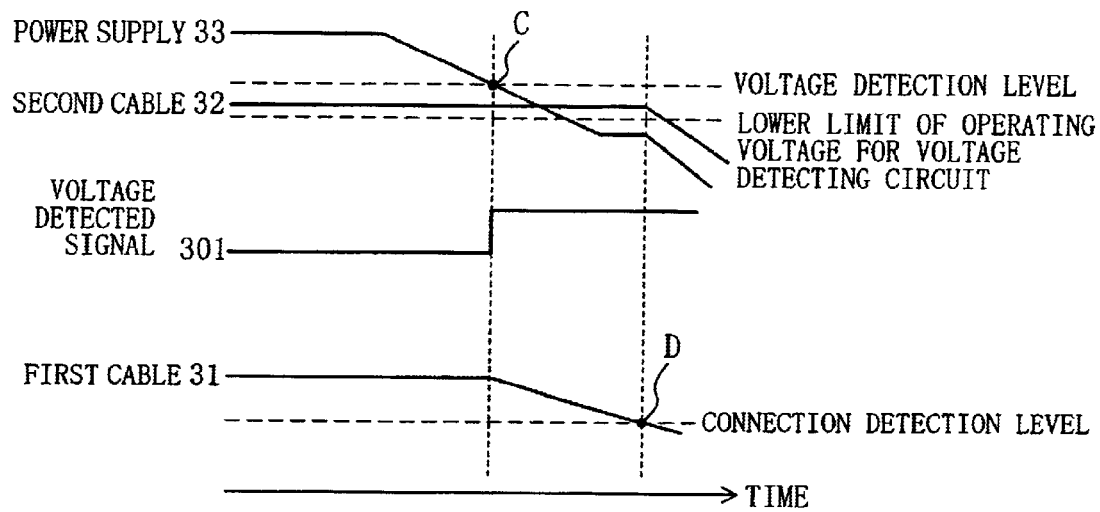
FIG. 4 is a timing diagram showing an operation of the signal transmitting and receiving system when the power supply is shut off.

FIG. 4 shows a timing chart depicting the voltages of the power supply 33 during the shut-off of the power supply, the voltage-detected signal 301, the first cable 31, and the second cable 32. As seen in the figure, when the voltage of the power supply 33 in the first semiconductor integrated circuit 1 is higher than the voltage detection level of the voltage-detecting circuit 38, the voltage-detecting circuit 38 does not output the voltage-detected signal 301 (the signal level is maintained at a low level), and the voltage-generating circuit 34 supplies a voltage that is equal to or higher than the connection detection level to the first cable 31. The voltage is detected by the second connection-detecting circuit 35 in the second semiconductor integrated circuit 2, and in the second semiconductor integrated circuit 2, a voltage that is equal to or higher than the connection detection level is supplied from the second voltage-generating circuit 36 to the second cable 32.

Thereafter, the power supply 33 of the first semiconductor integrated circuit 1 is shut off, and the power supply voltage becomes lower than the voltage detection level from a point C in the figure. Then, in the first semiconductor integrated circuit 1, the voltage-detecting circuit 38 outputs a high-level voltage-detected signal 301 to the voltage-generating circuit 34 so that the voltage-generating circuit 34 begins to stop supplying a voltage that is equal to or higher than the connection detection level to the first cable 31. Here, even if the power supply voltage of the power supply 33 becomes lower than the lower limit of operating voltage of the voltage-detecting circuit 38, the voltage that is equal to or higher than the connection detection level is supplied from the second cable 32 to the voltage-detecting circuit 38 and thereby the voltage-detecting circuit 38 continues to output the voltage-detected signal 301. Therefore, the voltage-generating circuit 34 continues to stop supplying the voltage that is equal to or higher than the predetermined connection detection level to the first cable 31, and as a consequence, the voltage of the first cable 31 becomes less than the connection detection level from a point D in the figure.

Thereafter, in the second semiconductor integrated circuit 2, as the voltage of the first cable 31 has become less than the connection detection level, the second connection-detecting circuit 35 recognizes that the connection with the first semiconductor integrated circuit 1 is cut off, and the second voltage-generating circuit 36 stops supplying a voltage that is equal to or higher than the connection detection level to the second cable 32. Accordingly, the voltage of the second cable 32 begins to drop to a voltage lower than the connection detection level. Thereby, the supply of a voltage that is equal to or higher than the connection detection level is cut off from the second cable 32 to the first voltage-detecting circuit 38 in the first semiconductor integrated circuit 1. However, this does not cause any problems because the voltage of the first cable 31 has already dropped to a voltage that is less than the predetermined connection detection level.

Thus, the present embodiment has a configuration in which power is supplied to the voltage-detecting circuit 38 from the second cable 32, and therefore, it is possible to properly recognize the connection with and the disconnection from the first semiconductor integrated circuit 1 due to the shut-off of the power supply 33, irrespective of the drop rate of the power supply voltage of the power supply 33 during the shut-off.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A semiconductor integrated circuit, connected to another semiconductor integrated circuit with a cable, comprising:

a voltage-detecting circuit that outputs a voltage-detected signal when the voltage of a power supply is less than a predetermined voltage detection level; and a voltage-generating circuit that stops supplying, to the cable, a voltage that is equal to or higher than a predetermined connection detection level in response to the voltage-detected signal from the voltage-detecting circuit;

wherein an external terminal is provided therewith; and wherein the voltage-detecting circuit receives a control signal from the external terminal and the control signal controls whether the voltage-detected signal is output or not, irrespective of the voltage of the power supply.

2. A semiconductor integrated circuit, connected to another semiconductor integrated circuit with a cable, comprising:

a voltage-detecting circuit that outputs a voltage-detected signal when the voltage of a power supply of the semiconductor integrated circuit is less than a predetermined voltage detection level; and a voltage-generating circuit that stops supplying, to the cable, a voltage that is equal to or higher than a predetermined connection detection level in response to the voltage-detected signal from the voltage-detecting circuit;

wherein a state machine that determines operating state of the semiconductor integrated circuit is provided therewith; and wherein the voltage-detecting circuit is connected to a power supply of the state machine so that the voltage of the power supply of the state machine controls whether the voltage-detected signal is output or not, irrespective of the voltage of the power supply.

3. A signal transmitting and receiving system comprising a first and a second semiconductor integrated circuits and a first and a second cables connecting the first and the second semiconductor integrated circuits each other, wherein:

the first semiconductor integrated circuit comprises:

a voltage-detecting circuit that outputs a voltage-detected signal when the voltage of a power supply is less than a predetermined voltage detection level; and a first voltage-generating circuit such that it generates a voltage that is equal to or higher than a predetermined connection detection level and supplies the voltage to the first cable when the voltage-detected signal is not received from the voltage-detecting circuit, whereas it stops generating the voltage equal to or higher than the predetermined connection detection level when the voltage-detected signal is received from the voltage-detecting circuit; and the second semiconductor integrated circuit comprises:

a second voltage-generating circuit that supplies to the second cable a voltage that is equal to or higher than the predetermined connection detection level while the first voltage-generating circuit is supplying to the first cable the voltage that is equal to or higher than the predetermined connection detection level;

wherein the voltage-detecting circuit of the first semiconductor integrated circuit is provided with, as a power supply thereto, the voltage that is equal to or higher than the predetermined connection detection level of the second cable, in addition to the power supply of the first semiconductor integrated circuit.

* * * * *